(12) United States Patent
Chao

(10) Patent No.: US 6,814,226 B2
(45) Date of Patent: Nov. 9, 2004

(54) MULTI-PURPOSE CONTAINERS

(75) Inventor: David Chao, Los Altos, CA (US)

(73) Assignee: Contour Optik, Inc., Chiayi (TW)

( * ) Notice: Subject to any disclaimer, the term of this patent is extended or adjusted under 35 U.S.C. 154(b) by 275 days.

(21) Appl. No.: 09/776,473

(22) Filed: Feb. 2, 2001

(65) Prior Publication Data

US 2002/0197095 A1 Dec. 26, 2002

(51) Int. Cl.$^7$ .............................................. A45C 11/04
(52) U.S. Cl. ........................... 206/5; 206/301; 351/158; 401/195; 368/10; D19/36; D10/30; D3/265
(58) Field of Search .................... 351/158, 63; 401/195, 401/52, 131; 206/5, 5.1, 6, 301, 18, 70, 38, 575, 579, 569, 459.1, 216, 214, 224, 371; D10/30, 31, 37, 38; D19/36; D3/263, 265; 368/10, 41, 278, 284

(56) References Cited

U.S. PATENT DOCUMENTS

| | | |
|---|---|---|
| 410,798 A | 9/1889 | Long |
| 494,624 A | 4/1893 | Brigg |
| 990,352 A | 4/1911 | Grell |
| 1,472,350 A | 10/1923 | Albanese |
| 1,549,501 A | 8/1925 | Patrick |
| 1,737,964 A | 12/1929 | Esterow |
| 1,784,169 A | 12/1930 | Baumgartner |
| 1,825,906 A | 10/1931 | Jeanneret |
| 1,957,157 A | 5/1934 | Bosch |
| 1,995,664 A | 3/1935 | Boyes |
| D101,073 S | 9/1936 | Tamis |
| 2,060,406 A | 11/1936 | Tiede |
| D106,074 S | 9/1937 | Wewetzer |
| 2,129,480 A * | 9/1938 | Schlacht ..................... 368/284 |
| D129,896 S | 10/1941 | Cohen |
| D136,214 S * | 8/1943 | Collopy et al. .............. D10/44 |
| 2,479,472 A * | 8/1949 | Coplon ........................ 206/37 |
| 2,553,257 A | 5/1951 | Honeyman |
| 2,567,564 A | 9/1951 | Ingraham |
| 2,622,729 A | 12/1952 | Uttz |
| 2,624,011 A | 12/1952 | Stern |
| 2,732,061 A | 1/1956 | Wilcox |
| 2,746,347 A | 5/1956 | Gaire |
| 2,772,772 A | 12/1956 | Taylor |
| 2,809,766 A | 10/1957 | Anderson |
| 3,036,699 A | 5/1962 | Huber |
| 3,038,593 A | 6/1962 | Root et al. |
| 3,267,980 A | 8/1966 | Bird |
| 3,323,638 A | 6/1967 | Dishart |
| 3,768,634 A | 10/1973 | Creevy |
| 4,075,702 A | 2/1978 | Davies |
| 4,296,945 A | 10/1981 | Pavlik |
| 4,336,882 A | 6/1982 | Sakwa |
| 4,478,330 A | 10/1984 | Lin |
| D286,270 S | 10/1986 | Huang |
| 4,682,310 A * | 7/1987 | Lund et al. .................. 368/278 |
| 4,887,896 A | 12/1989 | Akagi |
| 4,894,812 A * | 1/1990 | Wood .......................... 368/10 |
| 5,065,373 A * | 11/1991 | Alcantara Maia ........... 368/278 |
| 5,186,326 A | 2/1993 | Peckels et al. |
| D352,734 S | 11/1994 | Davis et al. |
| D358,606 S | 5/1995 | Davis et al. |
| 5,423,419 A | 6/1995 | Wentz et al. |
| 5,448,317 A | 9/1995 | Huang |
| 5,455,640 A * | 10/1995 | Gertsikov .................... 351/158 |
| D393,279 S * | 4/1998 | Byun ........................... D19/36 |
| 5,775,488 A | 7/1998 | Vaught |

(List continued on next page.)

Primary Examiner—Jila M. Mohandesi
(74) Attorney, Agent, or Firm—Greenberg Traurig LLP

(57) ABSTRACT

The present invention is directed to multipurpose containers in which a variety of items can be stored, such as eyeglasses writing instruments, pills, medicines, thermometers, rulers, note pads, to name a few of the nearly limitless number of items that can be stored. The containers may be provided with writing implements or gauges to measure a parameter, such as a timepiece, or a computational device, such as a calculator.

4 Claims, 19 Drawing Sheets

U.S. PATENT DOCUMENTS

| | | |
|---|---|---|
| 5,878,873 A | 3/1999 | Clark |
| 5,929,967 A | 7/1999 | Conner |
| 5,949,515 A | 9/1999 | Hoshino |
| 6,002,651 A * | 12/1999 | Baccaray .................. 368/10 |
| D423,555 S | 4/2000 | Conner |
| 6,079,872 A * | 6/2000 | Besson .................. 368/281 |
| 6,145,986 A | 11/2000 | Conner |
| D435,059 S | 12/2000 | Conner |

* cited by examiner

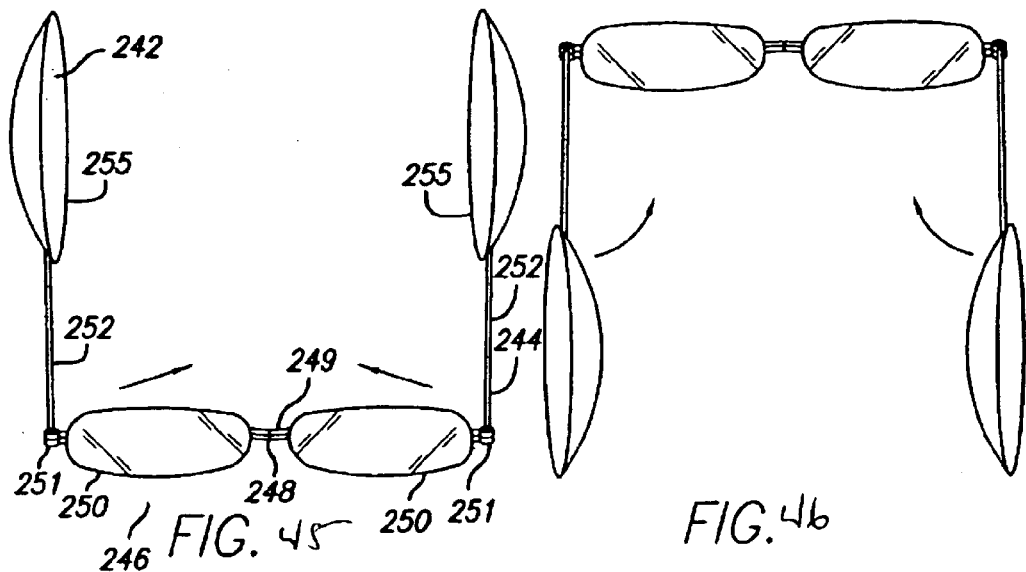
FIG. 45
FIG. 46
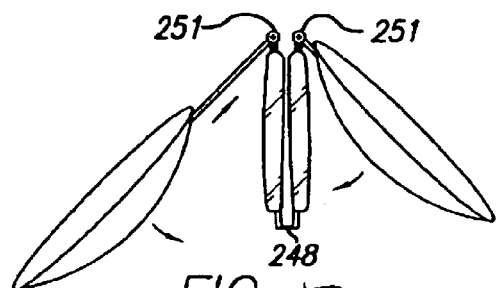
FIG. 47
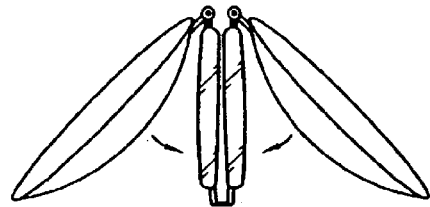
FIG. 48
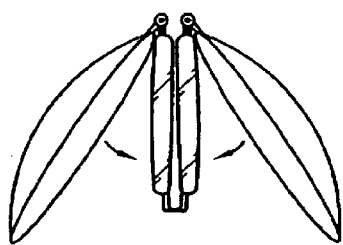
FIG. 49
FIG. 50
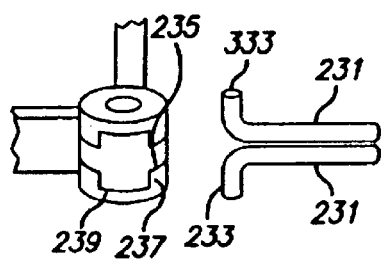
FIG. 51

MULTI-PURPOSE CONTAINERS

FIELD OF THE INVENTION

The present invention is directed to multipurpose containers in which a variety of items can be stored, such as eyeglasses writing instruments, pills, medicines, thermometers, rulers, note pads, to name a few of the nearly limitless number of items that can be stored. The containers may be provided with writing implements or gauges to measure a parameter, such as a timepiece, or a computational device, such as a calculator.

BACKGROUND OF THE INVENTION

There are numerous containers in the prior art that can be used to store items, that may or may not have another purpose associated with it, such as an attached writing instrument, or storing another item, or providing information on a prevailing aspect of the moment, such as temperature or time.

SUMMARY OF THE INVENTION

The present invention is directed to multipurpose containers and that can be used to store and retain a variety of items, including such items as eyeglasses, medicines, foods, rulers, thermometers, note pads, to name but a few of the possibilities. The containers have an interior space for storing an item, and may be provided with a second interior space for storing a second item, The container may be provided with a writing implement, or it may be provided with a gauge for measuring a parameter, or a computational device, such as a calculator. In one embodiment, the invention is a pair of folding eyeglasses that is transformable into its own compact case.

BRIEF DESCRIPTION OF THE DRAWINGS

FIGS. 1–3 show a multi-purpose container comprised of, in side-by-side arrangement.

FIGS. 45–50 show another embodiment of folding eyeglasses of the present invention.

FIG. 51 shows an embodiment of a hinge suitable for use in the present invention.

DETAILED DESCRIPTION OF THE PREFERRED EMBODIMENT

Figure 3:
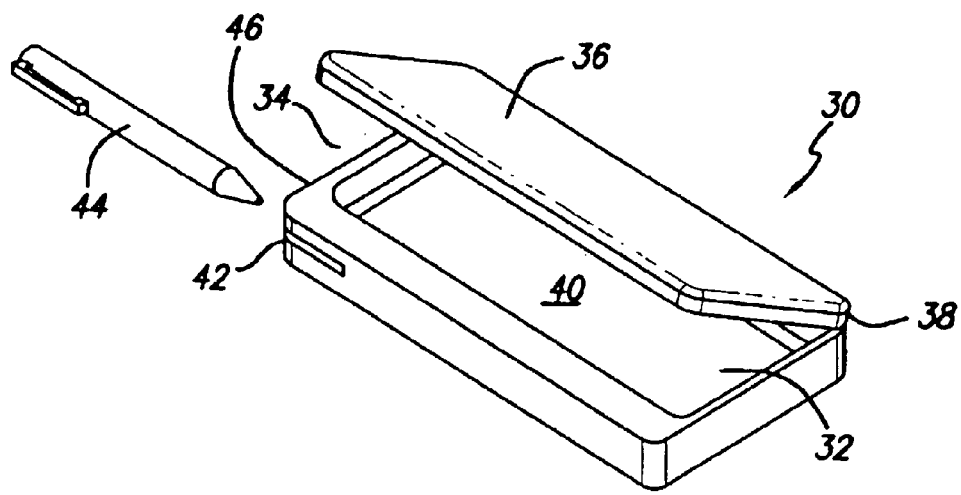
Figure 2:
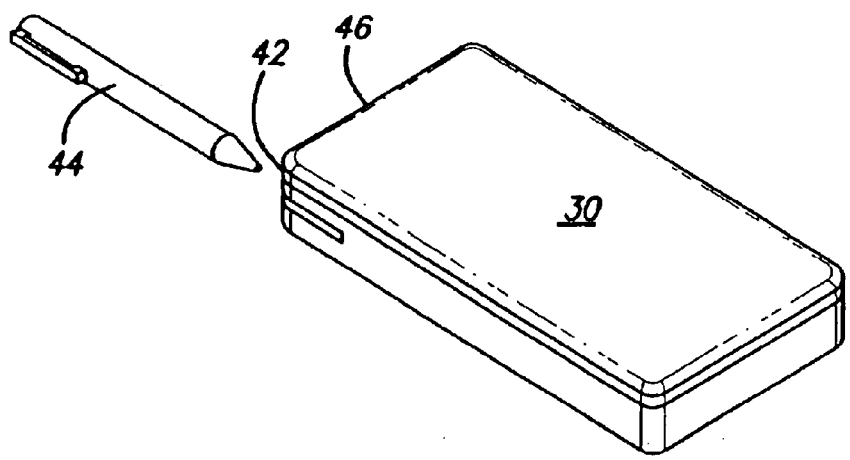

FIGS. 1–3 show a multi-purpose container 30 having, in side-by-side arrangement, a first container portion 32 configured to receive a hand held electronic device, wherein the first container portion is provided with first half 34, a second half 36, and a hinge 38 joining the first half and the second half, the second half movable between an open position (FIG. 3) and a closed position (FIGS. 1 and 2), the first container portion 32 having an interior space 40 for receiving a hand held electronic device. The electronic device can be inserted and removed from the container portion by moving the second half between the open position and the closed position.

The multi purpose container 30 is further provided with a second container portion 42 adjacent the first container portion 32. The second container portion 42 is configured to receive a writing instrument 44, the second container portion being open on one side 46, through which the writing instrument can be inserted and removed from the second container portion.

Figure 4:
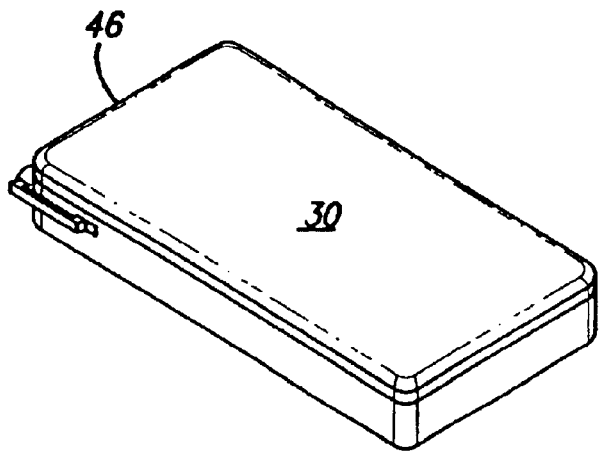
FIGS. 4–6 show variations on the multi purpose container of FIGS. 1–3.
Figure 6:
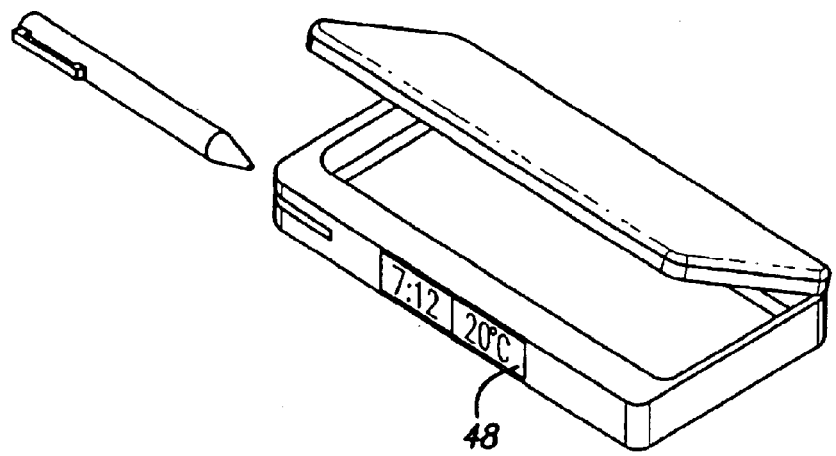
Figure 5:
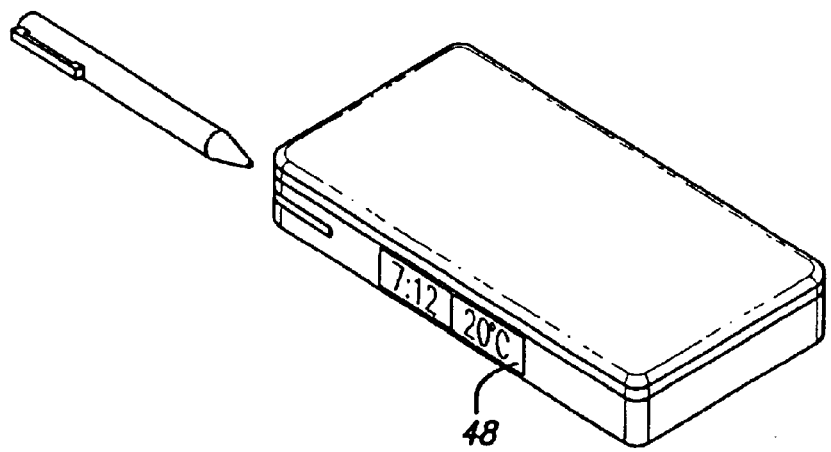
Figure 4:
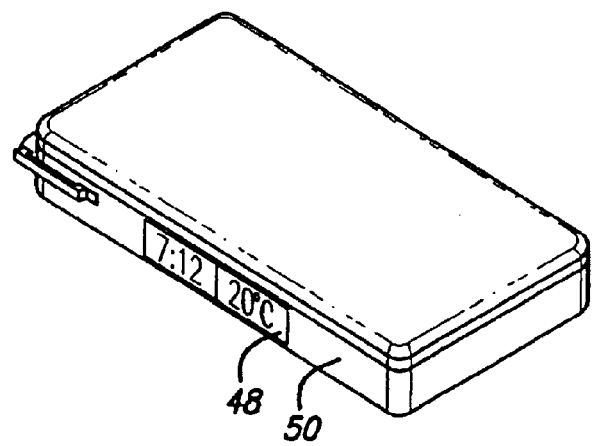

FIGS. 4–6 show the multi purpose container 30 of FIGS. 1–3 provided with a gauge to measure a parameter, such as time, temperature, positioning, humidity, barometric pressure, to name but few possibilities. As shown in the figures, the container is provided with a digital timepiece and a thermometer 48 on its depth side 50. In another embodiment, a computational device can be included, such as a calculator.

Figure 9:
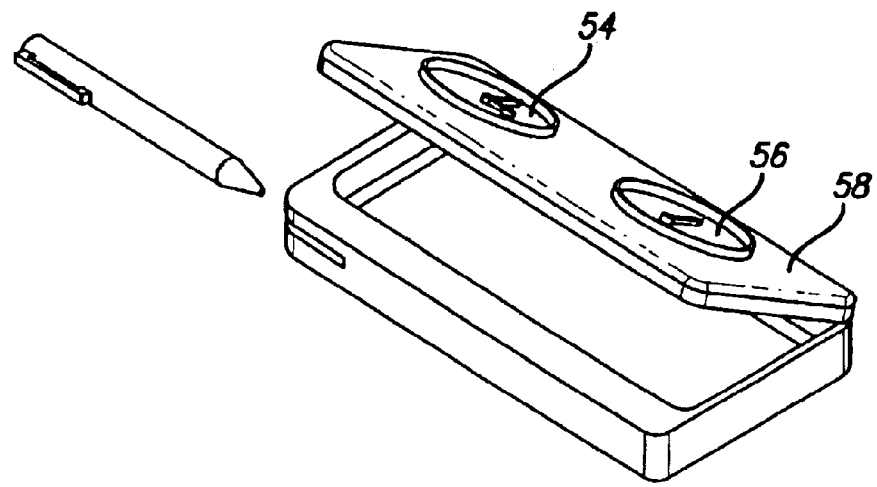
FIGS. 7–9 show variations on the multi purpose container of FIGS. 1–3.
Figure 8:
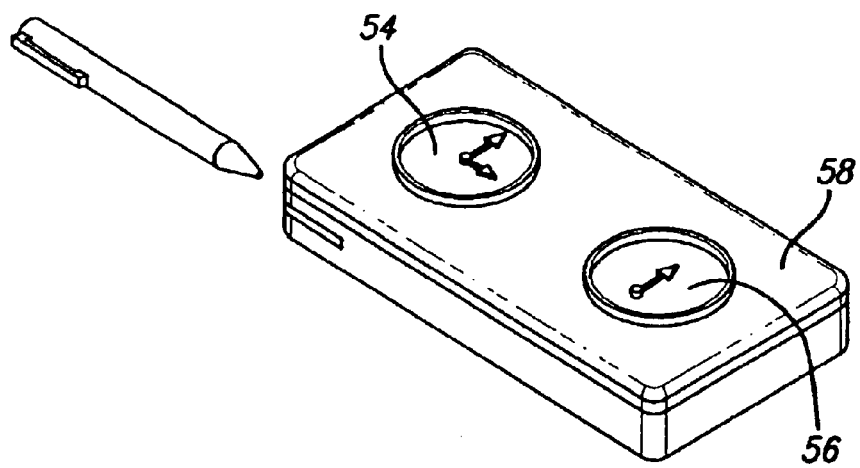
Figure 7:
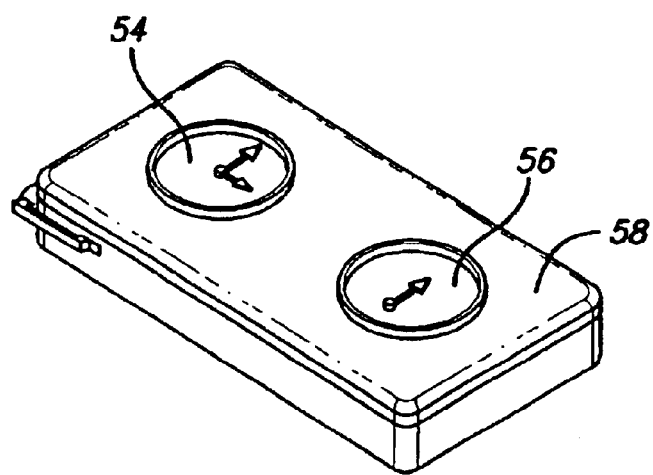

FIGS. 7–9 show the multi purpose container 30 of FIGS. 1–3 provided with a gauge to measure a parameter, such as time, temperature, positioning, humidity, barometric pressure, to name but few possibilities. A computational device, such as a calculator, can also be employed. As shown in the figures, the container is provided with an analog timepiece 54 and a compass 56 on its top side 58

Figure 12:
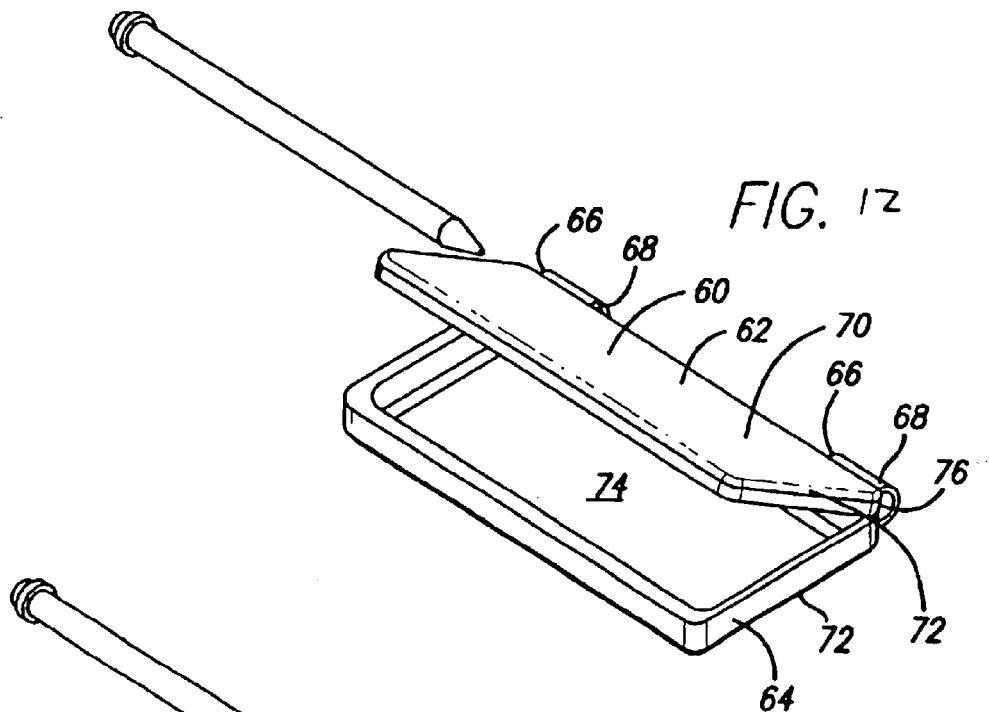
FIGS. 10–12 show perspective views of another embodiment of the present invention.
Figure 11:
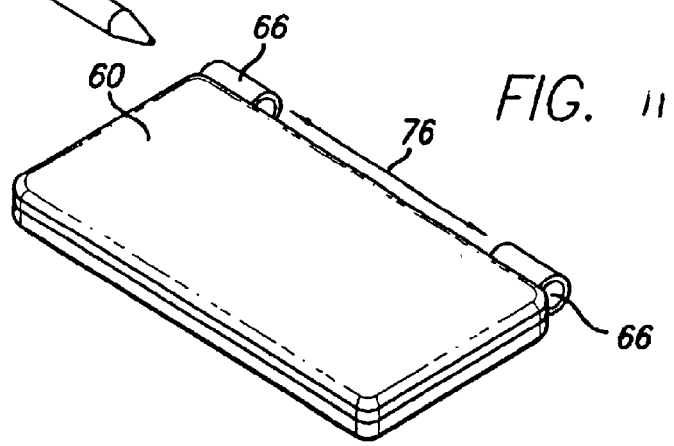
Figure 10:
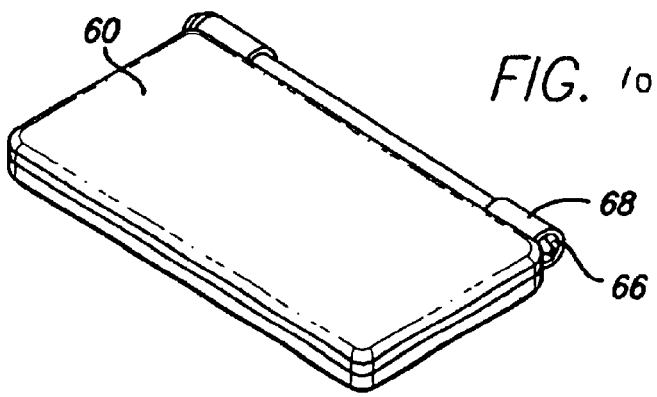

FIGS. 10–12 show a container 60 having a first half 62 and a second half 64, the first and second halves each having hinge forming members 66 that are joined together to form a hinge 68, permitting the container to be opened and closed. The halves are constructed of a base 70 and a skirt 72 that extends around the perimeter of the base 70 in a direction perpendicular to the base. The hinge forming members 66 are located on one side of the base. When the container is in the closed position, the skirt of the first half 62 and the skirt of the second half 64 are in an abutting relationship. The hinge forming members 66 on the first and second halves 62, 64 define an open space on the inside of the hinge forming members, in which space a writing instrument, or other object sharing that configuration, can be positioned. This arrangement can be constructed by varying the diameter of one of the hinge forming members so that it fits in the other hinge forming member. The interior space between the first and second halves, hereinafter referred to as the first interior space 74, is sized and configured to retain a pair of eyeglasses, or other objects, including but not limited to notepads calendars, diaries, foods, medicines, maps, storage medium (digital or analog), to name but a few possibilities. The second interior space 76 can house an item configured like a writing instrument, including but not limited to a writing implement such as a pen, pencil, a thermometer, pressure gauge, flashlight, to name but a few possibilities.

Figure 15:
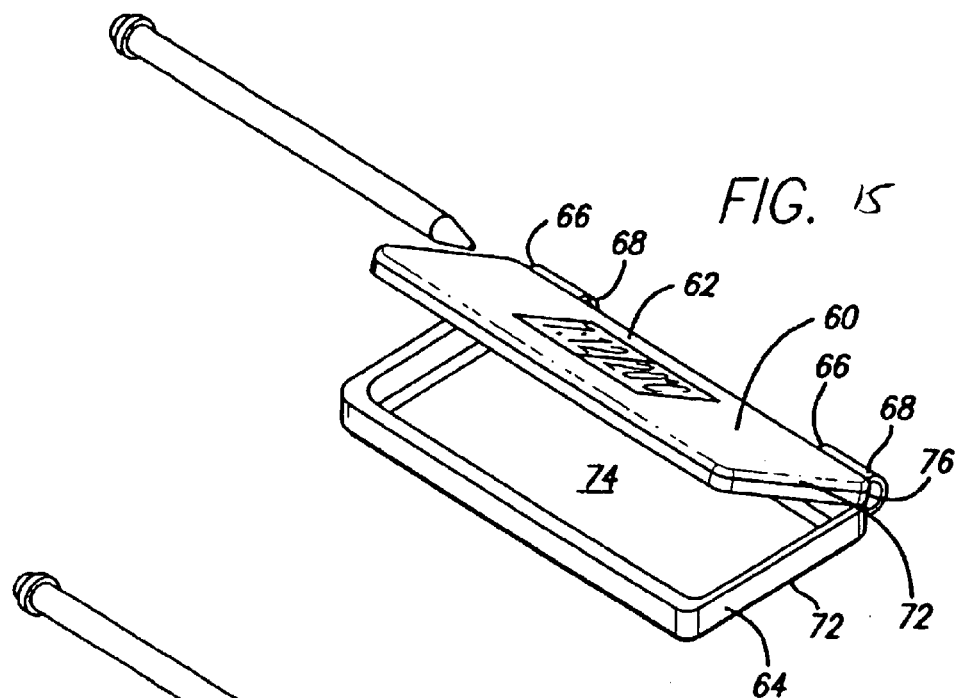
FIGS. 13–15 show variations on the multi purpose container of FIGS. 10–12.
Figure 14:
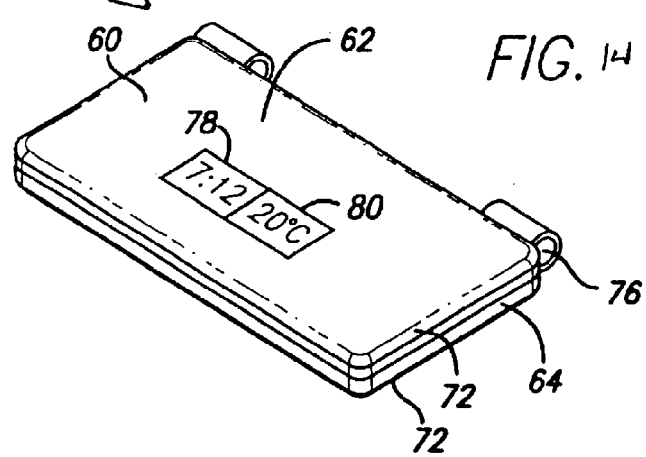
Figure 13:
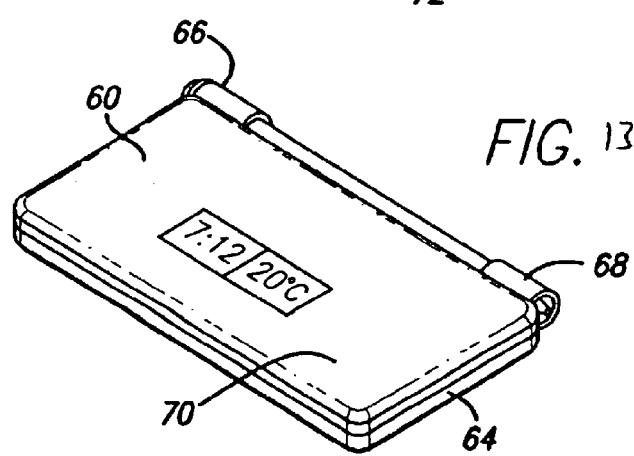

FIGS. 13–15 show a variation on the embodiment of FIGS. 10–12 by including gauges that measure parameters. Here, the gauges 78, 80 measure time and temperature. It should be understood that any kind of gauge may be employed, including those previously noted here. A computational device may also be placed where the gauge is placed.

Figure 16:
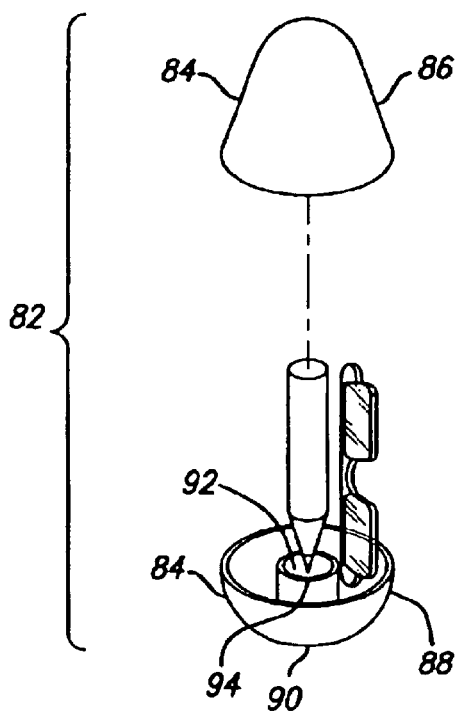
FIG. 16 is an exploded view of a another embodiment of the present invention.
Figure 17:
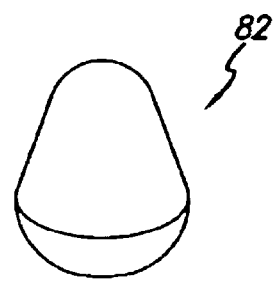
FIG. 17 is a perspective view of the embodiment of FIG. 16 shown in an assembled state.

FIG. 16 shows an exploded view of yet another embodiment of the present invention, which is a container 82 that, when not subjected to a force sufficient to flip it or turn it, remains in an upright position, or returns thereto. The container has a housing 84 having top 86 and bottom 88 zones, the bottom zone 88 having a rounded surface 90 constituting the bottom of the container. The bottom zone 88 is heavier than the top zone. The bottom zone can be made heavier than the top zone by including a metal weight into the bottom zone 88, or by constructing the bottom zone to have a density in excess of the density of the top zone. This can be accomplished by selecting the appropriate materials to achieve this result.

Figure 18:
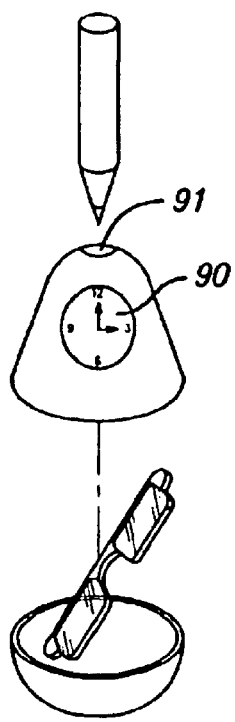
FIG. 18 is an exploded view of an embodiment having variations on the FIG. 16 embodiment.
Figure 19:
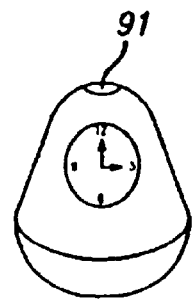
FIG. 19 is a perspective view of the embodiment of FIG. 18 shown in an assembled state.

When the top and bottom zones are joined together (FIG. 19), the housing defines an interior space in which at least one item can be stored. In one embodiment, the housing is provided with a top zone that is separable from the bottom zone in order to permit access to the interior space. See FIG. 18 The top zone can be provided with a conical shape. It should be understood that the top zone can be provided with a lid that can be positioned on the opening, or removed therefrom, in order to access the interior space and/or items stored therein.

Because the bottom of the container is rounded, and heavier than the remainder of the container, the container will, if not subjected to an external force, rest on its bottom, and remain in an upright position. If the container is pushed, it will wobble and then return to its upright position.

Figure 20:
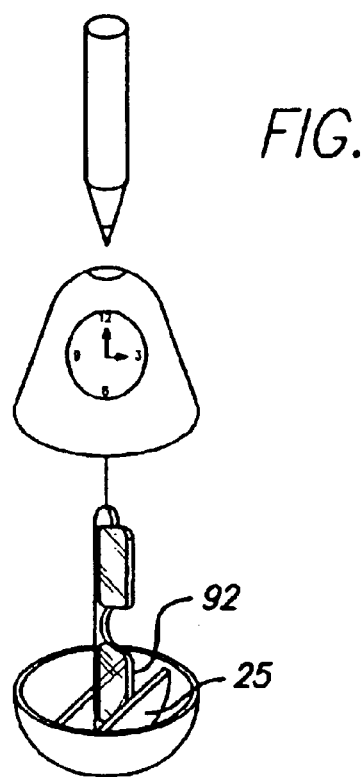
FIG. 20 is an exploded view of an embodiment having variations on the FIG. 16 embodiment.
Figure 21:
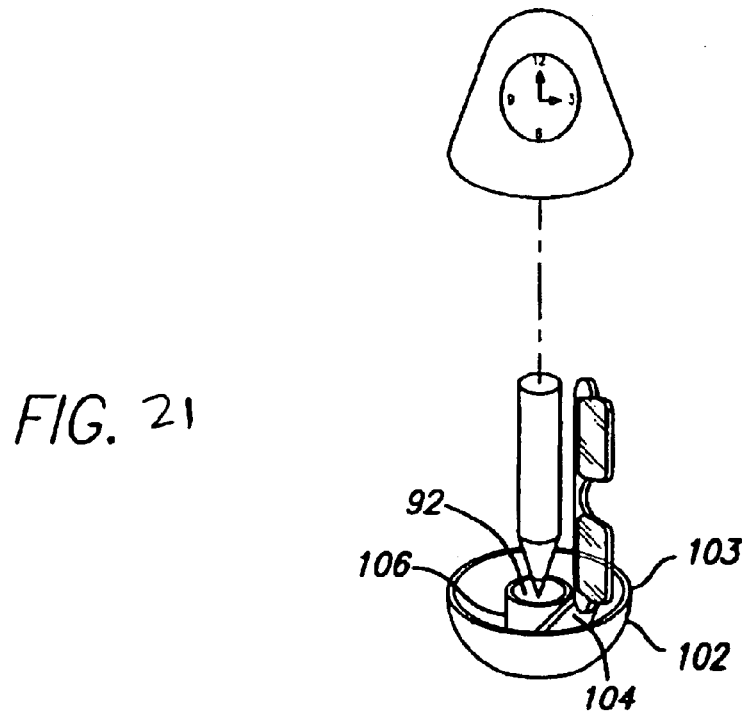
FIG. 21 is an exploded view of an embodiment having variations on the FIG. 16 embodiment.

In another embodiment, the container is provided with a gauge for measuring a parameter, such a timepiece 90, as shown in FIGS. 18–21. Alternatively, a computational device can be placed where the gauge is placed. In another embodiment, the container is provided with an opening 91 to receive a writing instrument. See FIGS. 18–20. In another embodiment, a pair of eyeglasses, or other item, can be stored in the container. See FIGS. 16–21 In another embodiment, the container is provided with compartments 92 for retaining the stored item in place. The compartment 92 may be a slot having circular sidewalls 94 that extend upward in the interior space from the bottom of the container, as shown in FIG. 20 Alternatively, the compartment 92 can be constructed out of a plurality of slot defining sidewalls 96 that extend upward in the interior space from a bottom of the container. See FIG. 20

Figure 22:
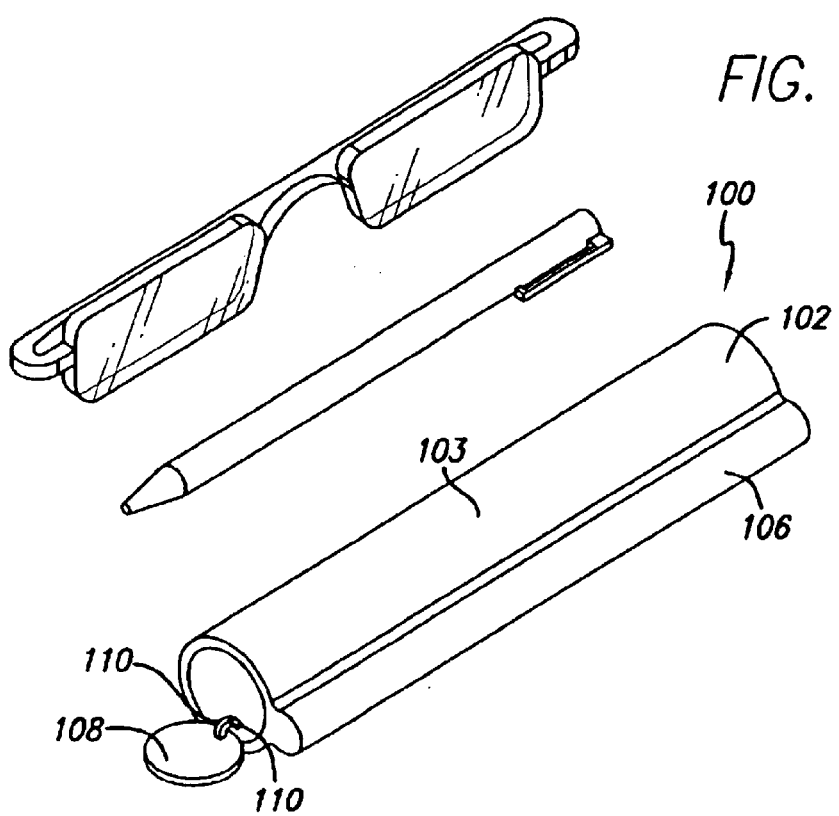
FIG. 22 is a perspective view of an embodiment of the present invention.

FIG. 22 shows a container for storing an item such as a pair of eyeglasses and a second container portion for storing an item having the configuration of a writing instrument. The container 100 has a first container portion 102 having a sidewall 103 that defines a first interior space 104. Container 100 further has a second container portion 106 defining a second interior space that can store a item having the configuration of a writing instrument, the second container portion being located on to the sidewall 103 of the first container portion 102.

The first container portion has a closure 108 attached to a hinge 110, which is mounted to the sidewall 103. The closure 108 is movable between a position closed on the container and an open position permitting access to the interior space.

Figure 23:
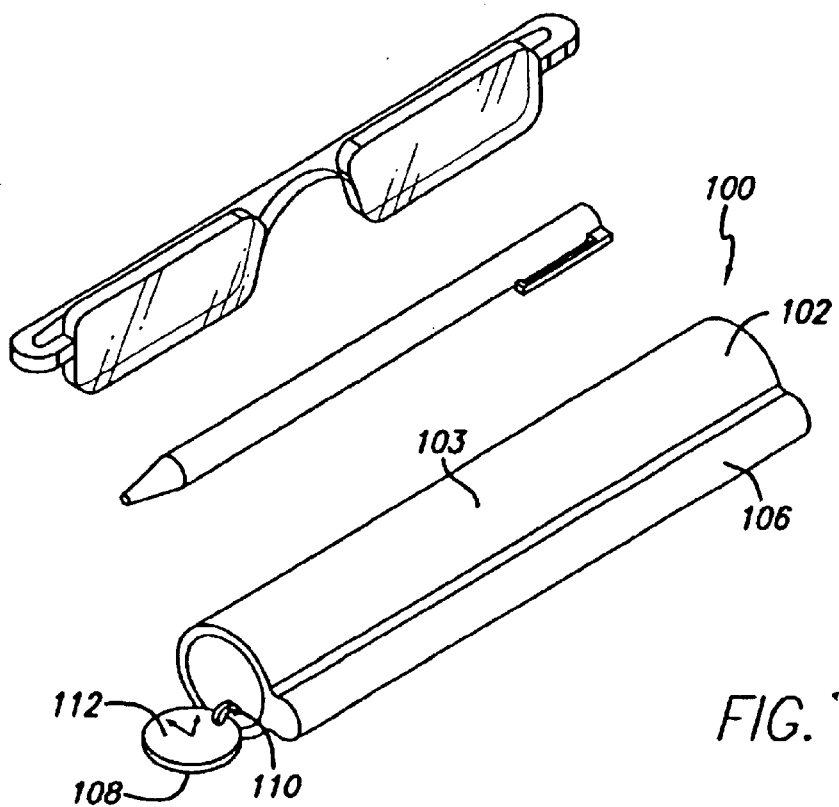
FIG. 23 is a perspective view of an embodiment having variations on the FIG. 22 embodiment.

In a variation on this embodiment shown in FIG. 23, the closure 108 is provided with a gauge 112 to measure a parameter, which in this case is a timepiece. The time piece 112 is located on the interior facing side of the closure, and so is visible when the closure is in the open position. Alternatively, a computational device can be provided.

Figure 24:
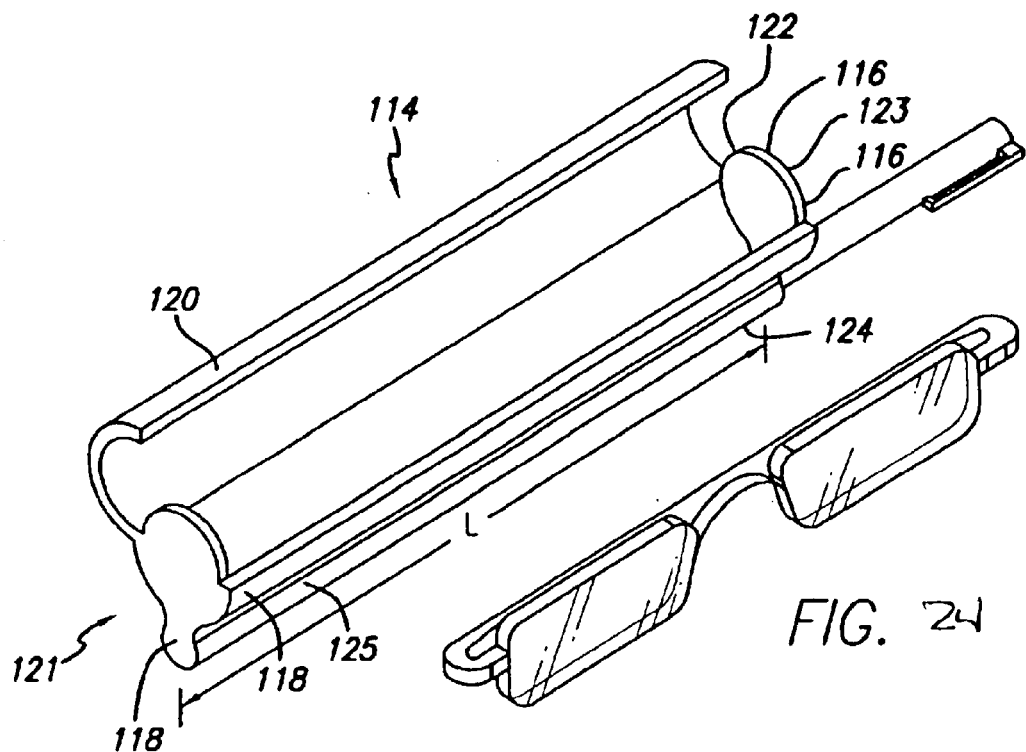
FIG. 24 shows a perspective view of an embodiment of the present invention.

FIG. 24 shows another embodiment of the present invention showing a container having first and second portions that has compartments configured to hold eyeglasses and a writing instrument. The container 114 has a first container portion 116 that is a hinged body having a length dimension L. Hinged body has two halves 118, 120 joined at a hinge 122 which extends in the length dimension. The second container portion 124 for the writing instrument is attached to one of the two halves. The hinged body is movable between a closed position and an open position along the hinge. The first hinged body has end closures 118 at a first and second ends 121, 123 of the body. When in a closed position, the body defines an interior space in which an item, such as a pair of eyeglasses, can be placed when it is in the closed position.

The second container portion 124 has a wall portion 125 that defines an interior space that can store an item configured like a writing instrument, the second container portion being joined to one of the halves of the hinged body that forms the first container portion.

Figure 25:
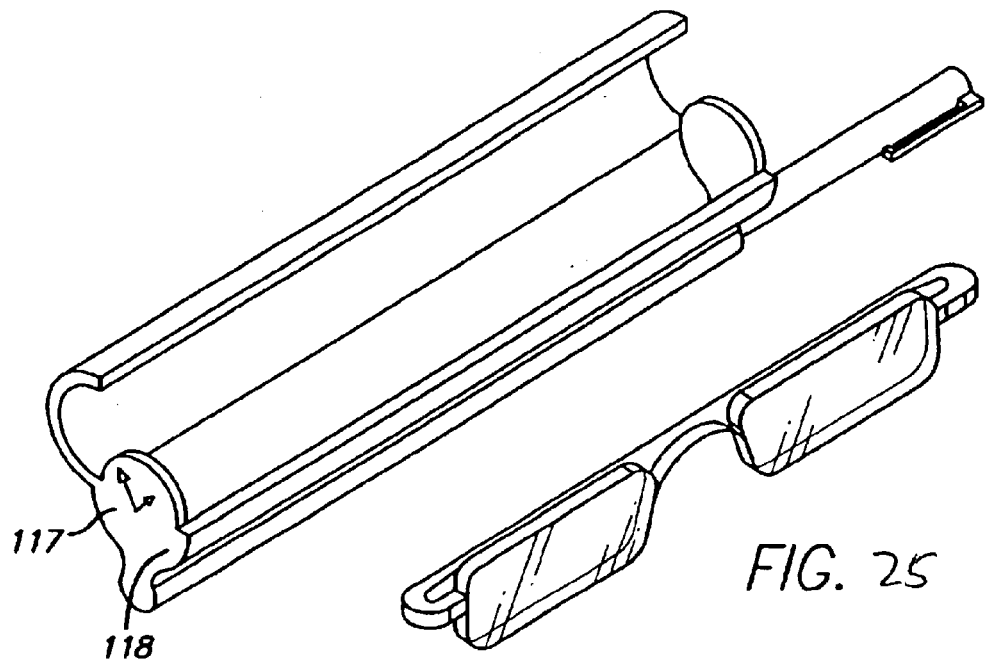
FIG. 25 is a perspective view of an embodiment having variations on the FIG. 24 embodiment.

In a variation of the embodiment shown in FIG. 24, at least one of the end closures 118 is provided with a gauge 117 for measuring a parameter. FIG. 25 shows a timepiece at one of the end closures. Alternatively, a computational device may be provided.

Figure 26:
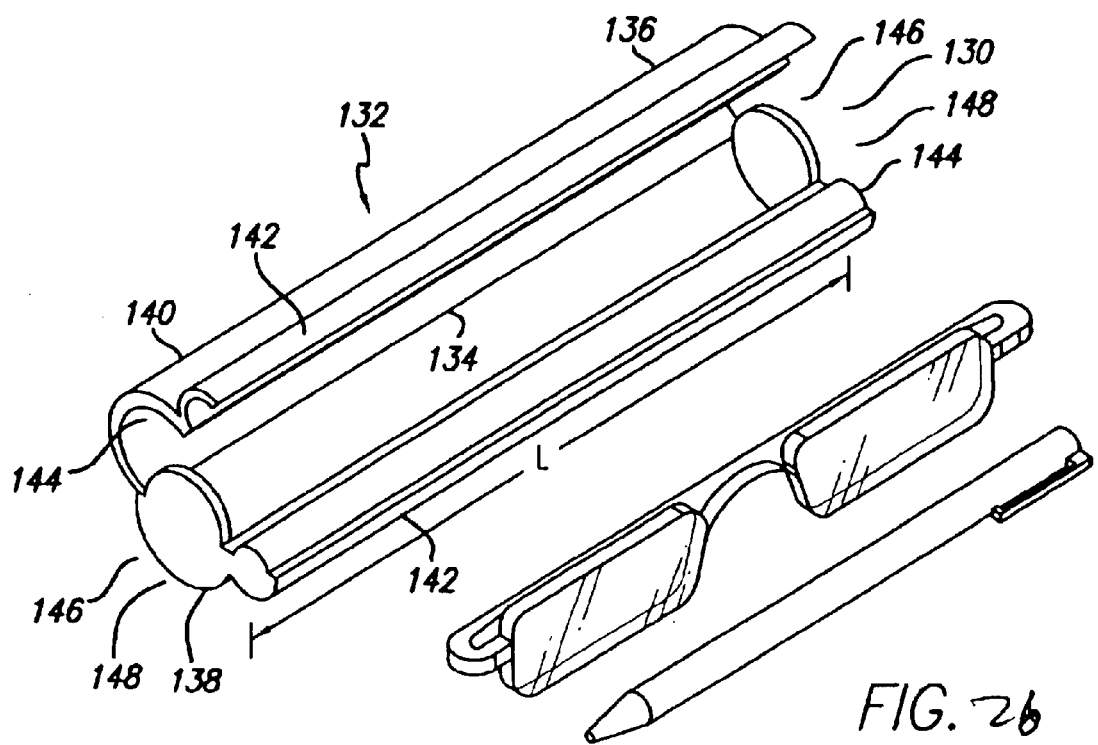
FIG. 26 shows a perspective view of an embodiment of the present invention.
Figure 27:
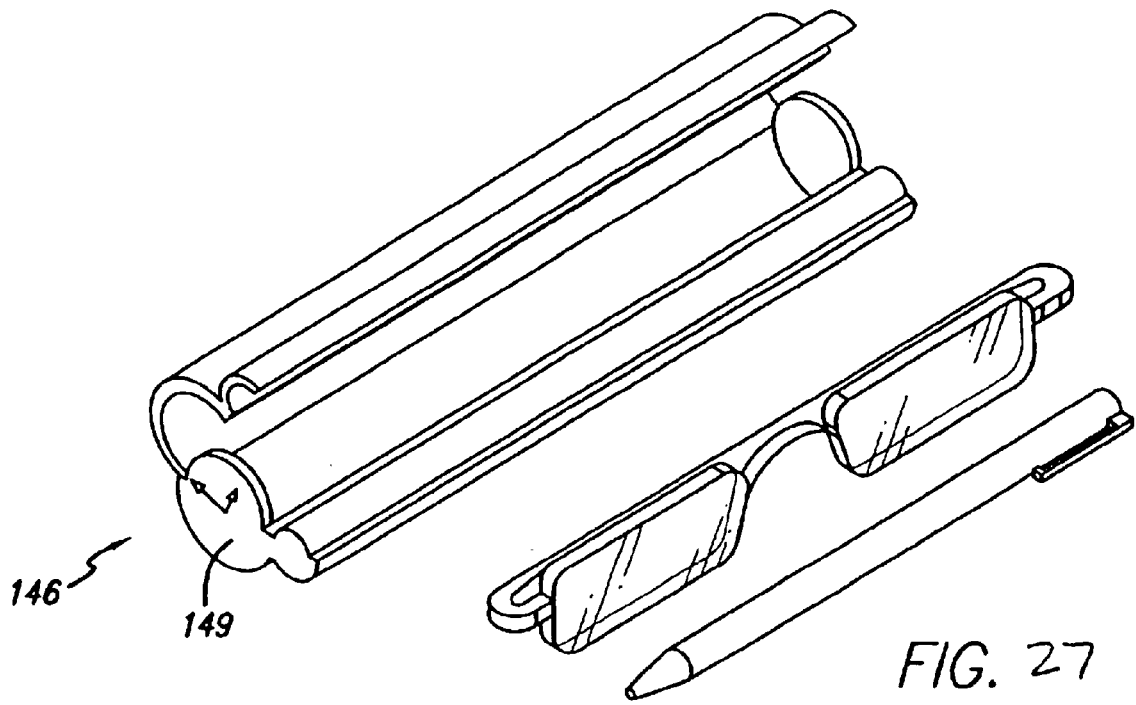
FIG. 27 is a perspective view of an embodiment having variations on the FIG. 26 embodiment.

FIG. 26 shows a container 130 for holding first and second container portions in an adjoining relationship. The container can hold items such as eyeglasses and writing instruments in the first and second container portions.

Container 130 is provided with a body 132 having first and second halves 136, 138 joined along a hinge 134 that extends in the length dimension L of the container. The first and second halves are movable along the hinge between a closed position and an open position.

Figure 32:
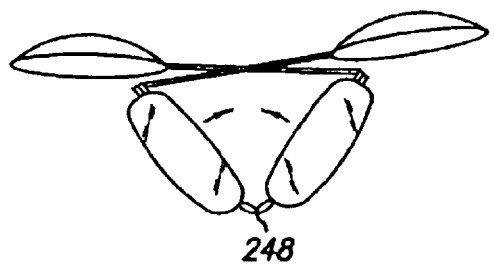

Each of the halves are divided into first container forming portion 140 and a second container forming portion 142. As shown in FIG. 32, the first and second halves have sidewalls that are partitioned into the first container forming portion and second container forming portion at zone boundary 144, which is contiguous with the first and second container forming portions 140, 142.

Body 132 has end closures 146 at a first and second ends 148 of the body. When the container is in the closed position, the body has first and second interior spaces located in the first and second container portions. That is, the zone boundaries 144 of the first and second container forming portions 140, 142 enter into an adjacent relationship when the container is in the closed position.

The first container portion is configured to retain a pair of eyeglasses, but any of the other aforenoted items may be stored there. The second container portion is configured to retain a writing instrument, but any of the other aforenoted items may be stored there.

Figure 31:
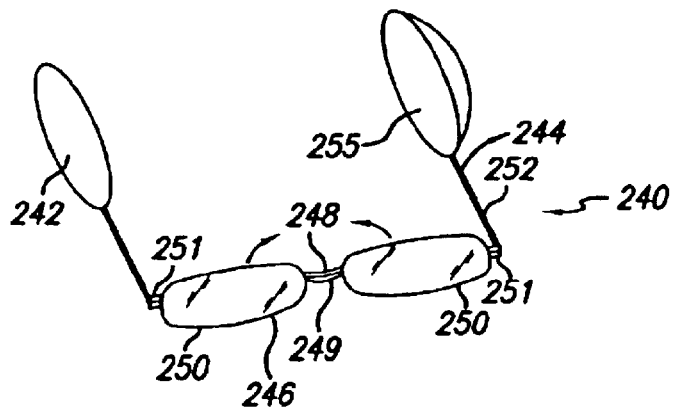
FIGS. 31–35 show perspective views of an embodiment of the present invention.

In a variation of the embodiment shown in FIG. 26, at least one of the end closures 146 is provided with a gauge 149 for measuring a parameter. FIG. 31 shows a timepiece at one of the end closures. Alternatively, a computational device may be provided.

Figure 28:
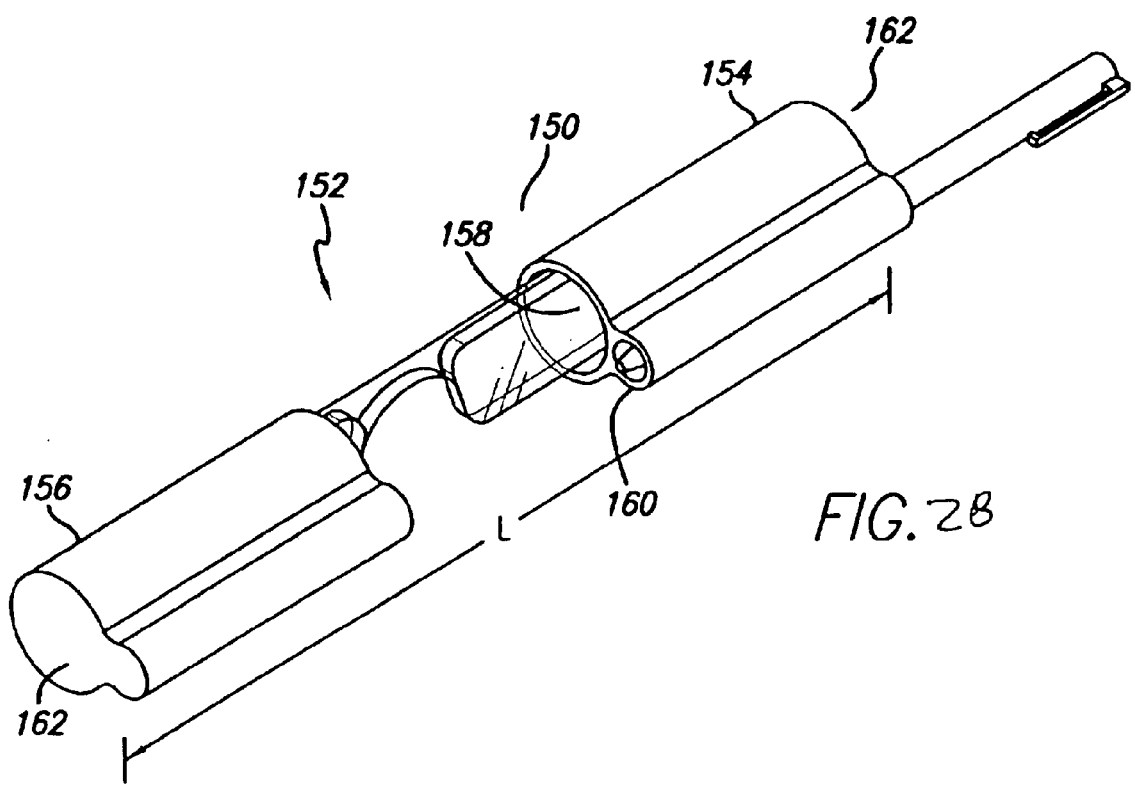
FIG. 28 shows a perspective view of an embodiment of the present invention.
Figure 29:
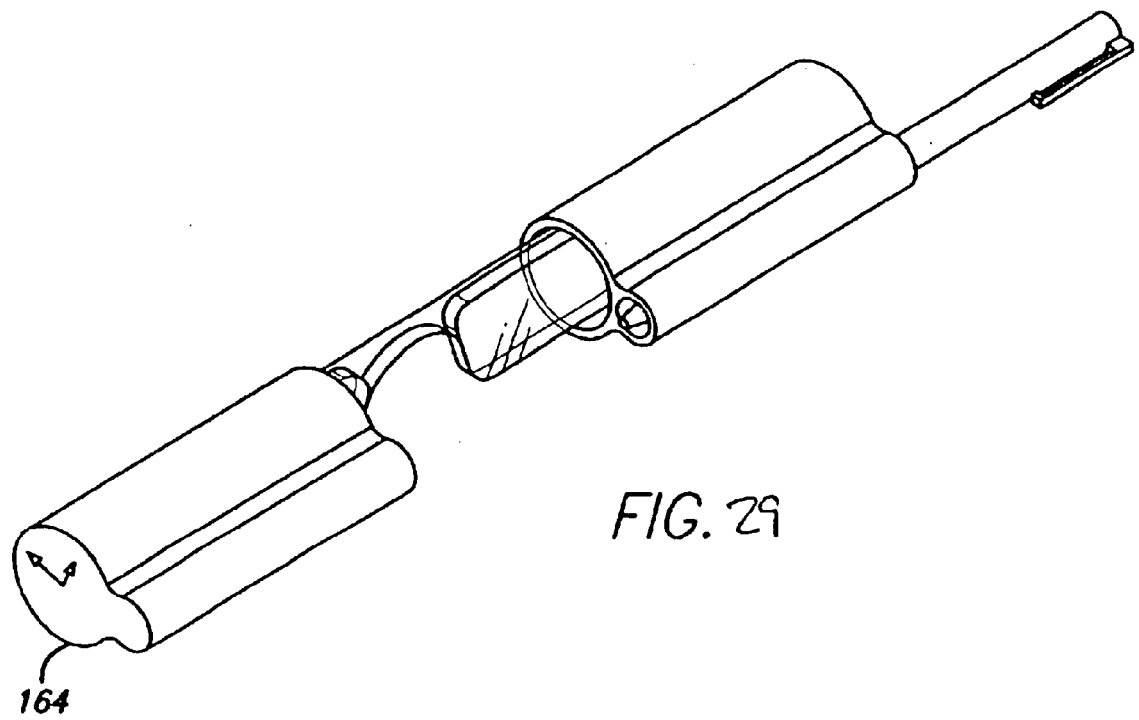
FIG. 29 is a perspective view of an embodiment having variations on the FIG. 28 embodiment.

FIGS. 28 and 29 show a container 150 comprised of a body 152 having a length dimension L that is divided in two halves 154, 156 in a direction that intersects the body. The halves can be joined together to form a closed container, or separated to provide an open container. The halves 154, 156 further have first and second container portions 158, 160 in an adjoining relationship that define first and second interior spaces for retaining items placed within the interior spaces. Thus, when the halves are joined together, items can be retained in the first and second container portions.

The first container portion 158 is configured to retain a pair of eyeglasses, but any of the other aforenoted items may be stored there. The second container portion 160 is configured to retain a writing instrument, but any of the other aforenoted items may be stored there.

In one embodiment, halves 154, 156 are about equal in length. In another embodiment, the first container portion 158 has a perimeter and the second container portion 160 is located on the perimeter. In another embodiment, the second container portion 160 is provided with an open end.

In a variation of the embodiment shown in FIG. 28, at least one of the end closures 162 is provided with a gauge 164 for measuring a parameter. FIG. 29 shows a timepiece at one of the end closures. Alternatively, a computational device may be provided.

Figure 30:
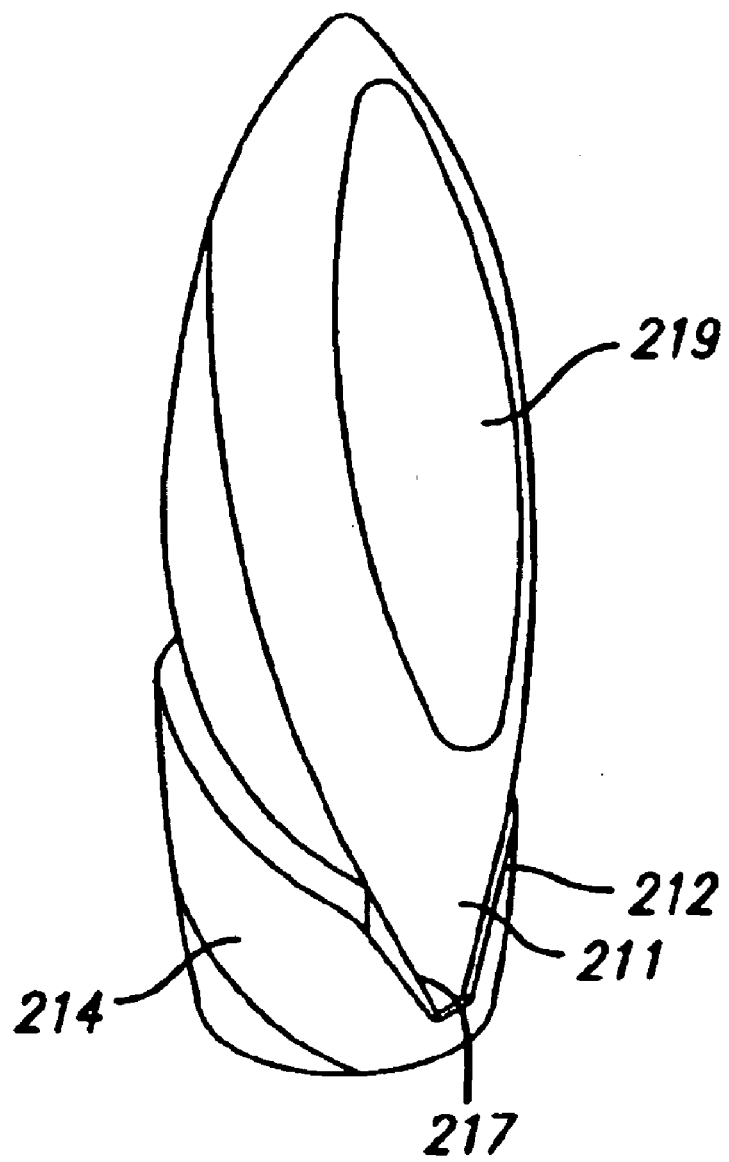
FIG. 30 shows a perspective view of an embodiment of the present invention.
Figure 42:
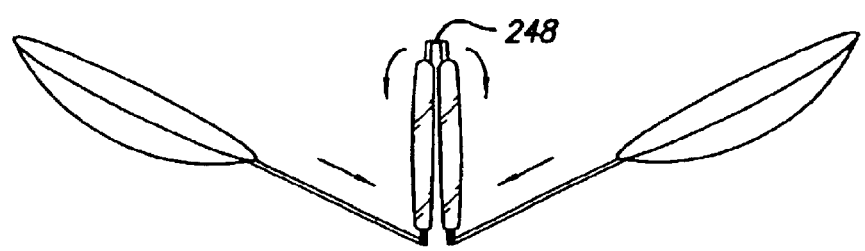

FIG. 30 shows a writing instrument that is provided with a mirror 219. The mirror may be positioned near the tip 211 of the writing implement 212, or the mirror may cover the predominant portion of a barrel side. Although FIG. 42 shows a first end having a fingernail shaped housing in which the writing implement 212 is positioned, it should be understood that the other configurations are possible.

FIG. 31 shows a folding eyeglass frame 240 in which the glasses, when in the open position (FIG. 31) are configured to be worn in the conventional manner, and a closed position (FIG. 36) in which the lenses and all or a substantial portion of the frame are enclosed within clam shell like portions 242 of the frame 240 that serve as the ear rest portions of the arms 244. When in the folded the state, it is not apparent that the resulting object, which resembles a clam, contains a pair of glasses. The compact form the glasses take, when folded, provides apparent space saving benefits.

Figure 34:
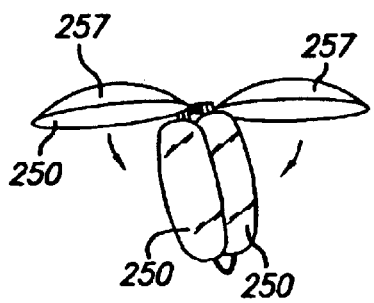
Figure 35:
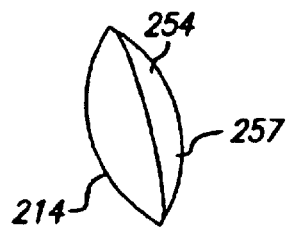
Figure 36:
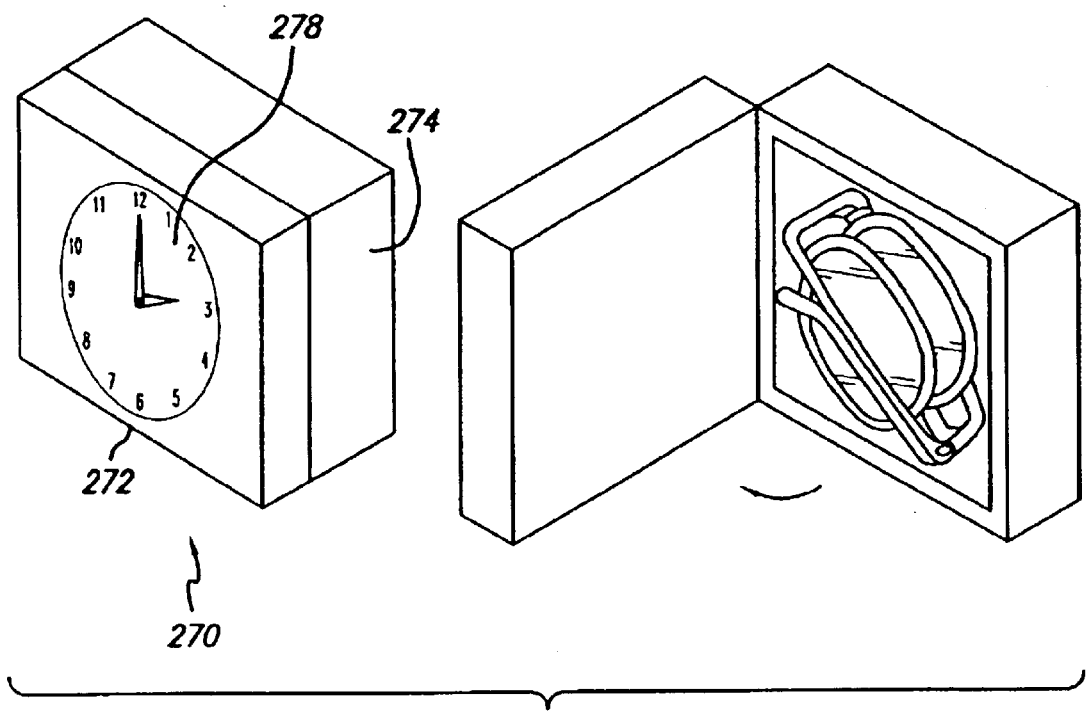
FIGS. 36–38 show perspective views of an embodiment of the present invention.

The glasses are provided with a front frame 246 including a pair of lens retaining portions joined together by a hinged bridge 248. The hinged bridge is constructed of two hinge forming members 249, each of which extends from the inward side of the lens retaining members 250. The hinge forming members are provided with apertures which are placed in alignment with each other and joined together by a screw, pin, bolt, or other known devices for joining a hinge. The glasses can be folded along the hinge, as shown in FIGS. 34–36.

Arms 244 are attached to the outward sides of the lens retaining members 250 at hinges 251 in same manner as described with respect to the joining the hinge forming members at the bridge. The hinged arms can be moved outward, in a configuration in which the glasses can be worn by the user, or moved inwardly, towards the lens retaining members.

The arms are constructed of a first relatively thin portion 252 that extends from the hinges 251. Concave shaped ear rests 254 are slidably mounted over the relatively thin portions 252. The concave shaped ear rests 254 have an open face 255 in the direction of the user's head.

Figure 33:
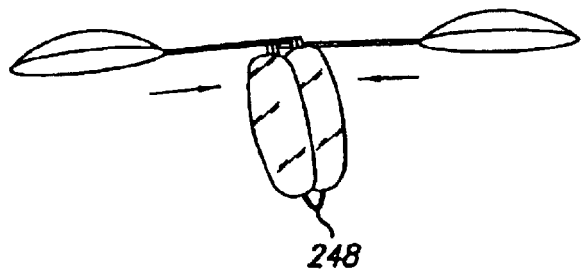

After wearing the glasses, the user can fold them into a compact, space saving form, more easily stored than the unfolded form. The user slides the ear rests forward over the relatively thin portions of the arm (FIG. 33), folds the glasses inward at the hinges 251 so that the lens retaining members approach each other and eventually abut each other (FIG. 34), and then folds the concave shaped ear rests 254 over the lens retaining members on the other side of the glasses (FIGS. 35 and 36). In this folded state, the edges 257 of the ear rests 254 abut each other, and the lens retaining members and other portions of the frame are enclosed within the ear rests.

Figure 37:
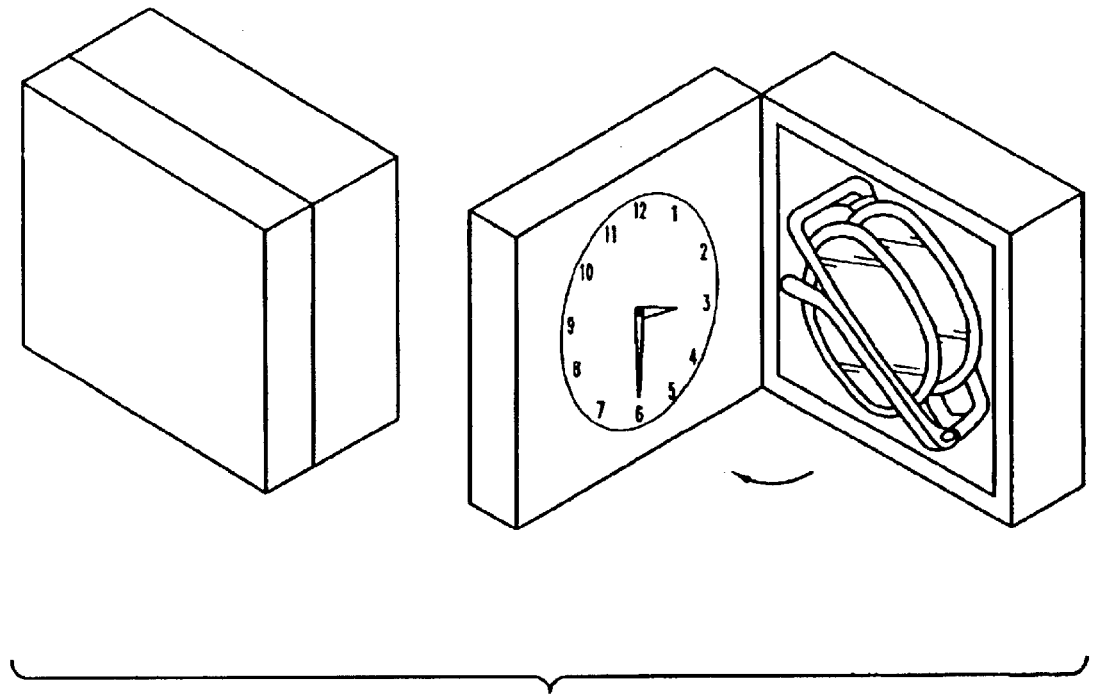

FIG. 37 shows a container 270 for storing folding eyeglasses in a container that is provided with a cover portion 272, a base portion 274, and a gauge 278 for measuring a parameter, such as a timepiece or any of the others previously noted. Alternatively, a computational device may be provided. The gauge is positioned on the face of the cover portion 272. The cover portion 272 is attached to the base portion by a hinge 276. An item, such as a pair of folding eyeglasses, can be stored in the interior container space, and enclosed there when the cover is closed. Any of the other previously mentioned items can be stored there.

Figure 38:
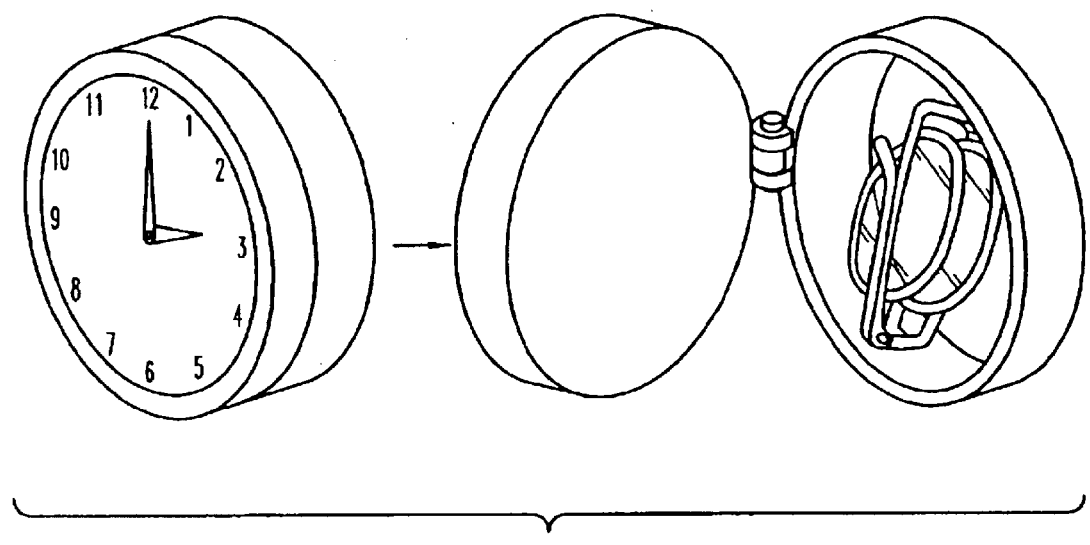

FIG. 38 shows a variation on the previous embodiment. Here, the timepiece 278 is positioned on the interior face 272 of the cover, and is visible only when the cover is in the open position.

The container can take any known shape. Exemplary are the square and rounded shapes shown in FIGS. 37, 38.

Figure 39:
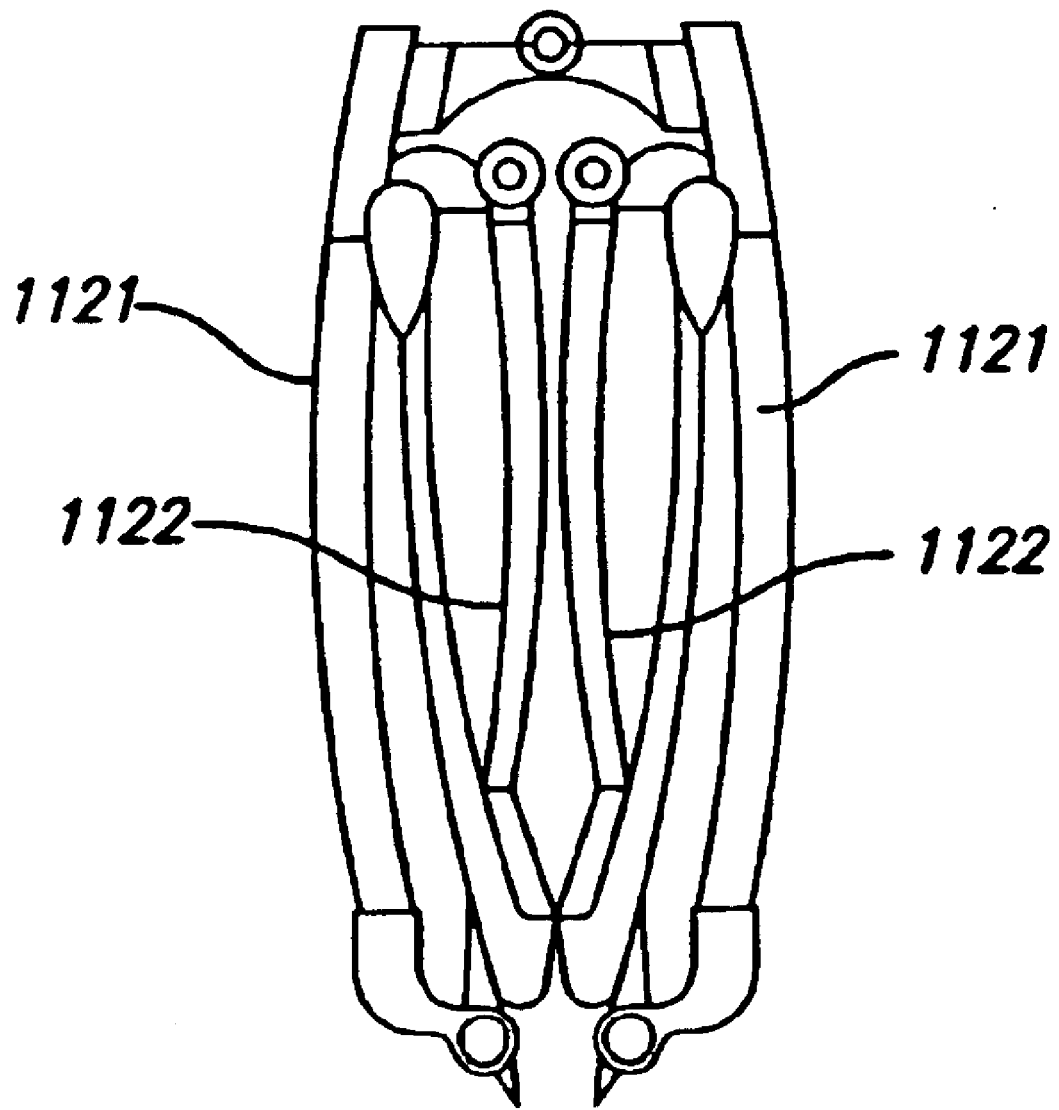
FIGS. 39 and 40 illustrate a pair of foldable eyeglasses in extended and folded state which can be stowed in the pen.
Figure 40:
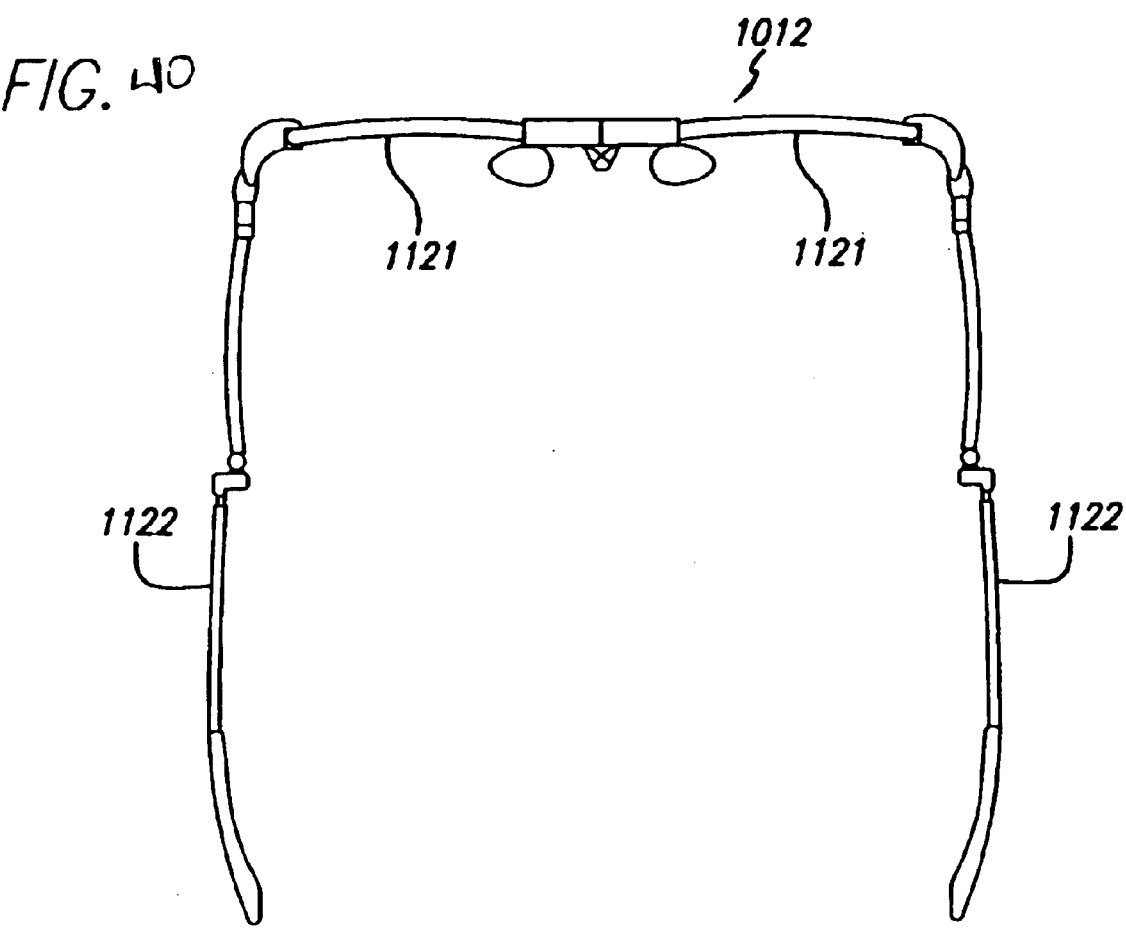
Figure 41:
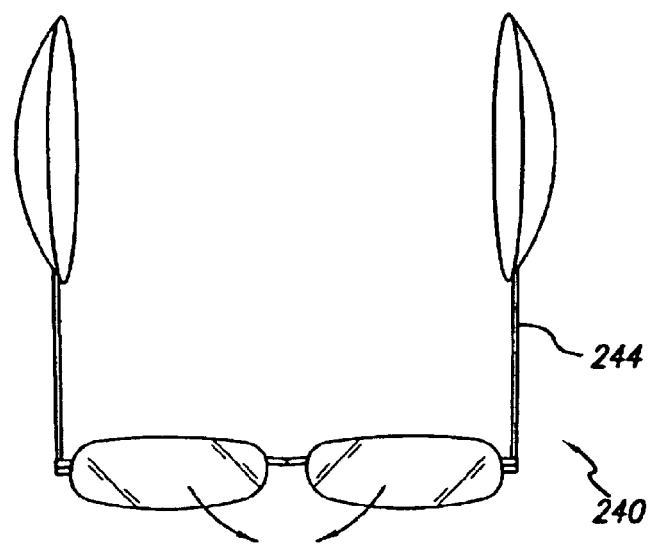
FIGS. 41–44 show another embodiment of folding eyeglasses of the present invention.

Referring to FIGS. 39 and 40, the eyeglasses 1012 in this embodiment are preferably of a foldable type having a pair of foldable lenses 1121 and a pair of foldable temples 1122 such that they can be folded compactly for placement in the interior chamber 11.

FIGS. 41–44 show a folding eyeglass frame 240 in which the glasses, when in the open position (FIG. 41) are configured to be worn in the conventional manner, and a closed position (FIG. 44) in which the lenses and all or a substantial portion of the frame are enclosed within clam shell like portions 242 of the frame 240 that serve as the ear rest portions of the arms 244. When in the folded the state, it is not apparent that the resulting object, which resembles a clam, contains a pair of glasses. The compact form the glasses take, when folded, provides apparent space saving benefits.

Figure 43:
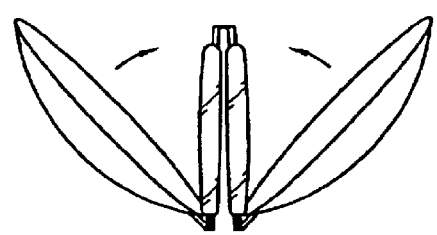
Figure 44:
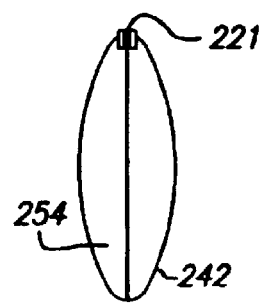

The glasses are provided with a front frame 246 including a pair of lens retaining members 250 joined together by a hinged bridge 248. The hinged bridge is constructed of two hinge forming members 249, each of which extends from the inward side of the lens retaining members 250. The hinge forming members are provided with apertures which are placed in alignment with each other and joined together by a screw, pin, bolt, or other known devices for joining a hinge. The glasses can be folded along the hinge, as shown in FIGS. 42–44. Here, during folding, the hinged bridge 248 is positioned in the space where the user's head would be when in the open position of FIG. 41. This is in distinction to the embodiment of FIGS. 31–35 where, during folding, the lens retaining members 250 are positioned in the space where the user's head would be when in the open position of FIG. 49. In other words, lens retaining members fold inward in FIGS. 31–35. They fold outward in the embodiment of FIGS. 41–44. A clasp 221 can be provided on the case to keep the clam shell like portions 242 in a closed position.

FIGS. 45–50 shows another embodiment of folding eyeglasses having case members having the components aforedescribed: a front frame 246, lens retaining members 250 joined together by a hinged bridge 248, clam shell like portions 242 of the frame 240 that serve as the ear rest portions of the arms 244. The hinged bridge is constructed of two hinge forming members 249, arms 244 attached to the outward sides of the lens retaining members 250 at hinges 251, the arms being constructed of a first relatively thin portion 252 that extends from the hinges 251, and concave shaped ear rests 254 are slidably mounted over the relatively thin portions 252. The concave shaped ear rests 254 have an open face 255 in the direction of the user's head.

FIG. 51 shows the hinge 251. A spring 233 constructed of resilient and flexible material is attached to an end of the relatively thin portions 252 of the arms 244. The spring has a two wires 231 extending in the direction of the arm, and a portion 233 attached to each wire that extends substantially perpendicular to the direction of the wires. The wires are fitted into hinges 251, which are provided with a slot 235 having a slot portion 237 extending around the periphery and a vertical slot portion 239 on the front side and rear side of the hinge. By squeezing the wires, the arms can be pivoted through the slot 235. The arms lock into either a front position or rear position when the wires enter the vertical slot portion 239 position, where they expand. When in the wear position, the arms are on the back side of the lens retaining members 250 (FIG. 45).

To fold the glasses, the arms 244 are moved to the front position (FIG. 46) and folded inward at the hinged bridge 248. The concave shaped ear rests are slid up towards hinge 251, and the arms 244 are brought closer to the lens retaining member 251 (FIG. 47). In this arrangement, the open face 255 of the concave shaped ear rests 254 face outward (FIG. 48). The concave shaped ear rests are then rotated to encase the lenses. The concave shaped ear rests can be made of a durable flexible plastic material that facilitates the rotating action.

While the present invention has been described in connection with particular embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A container for storing an item, comprised of:

a first container portion having a sidewall that defines a first interior space;

a second container portion defining a second interior space that is configured to store a writing instrument, the second container portion being positioned in a fixed relationship to the sidewall of the first container portion;

the first container portion having a closure attached thereto by a hinge, the closure being moveable between a closed position on the container and an open position permitting access to the first interior space;

wherein the closure is provided with an inside surface which faces into the first interior space when the closure is in the closed position and an outside surface which faces away from the first interior space when the closure is in the closed position;

wherein a timepiece is mounted to the inside surface of the closure such that: (a) the timepiece moves with the closure as the closure moves from the open position to the closed position; (b) the timepiece is disposed outside of the first interior space and is visible when the closure is in the open position; and (c) the timepiece is disposed within the first interior space and is not visible when the closure is in the closed position.

2. In combination:

(a) a container for storing an item, comprised of:

a first container portion having a sidewall that defines a first interior space;

a second container portion defining a second interior space that is configured to store a writing instrument, the second container portion being positioned on the sidewall of the first container portion;

the first container portion having a closure attached thereto by a hinge, the closure being moveable between a closed position on the container and an open position permitting access to the first interior space;

wherein the closure is provided with an inside surface which faces into the first interior space when the closure is in the closed position and an outside surface which faces away from the first interior space when the closure is in the closed position;

wherein a timepiece is mounted to the inside surface of the closure such that: (i) the timepiece moves with the closure as the closure moves from the open position to the closed position; (ii) the timepiece is disposed outside of the first interior space and is visible when the closure is in the open position; and (iii) the timepiece is disposed within the first interior space and is not visible when the closure is in the closed position; and (b) a pair of eyeglasses stored within the first container portion.

3. In combination:

(a) a container for storing an item, comprised of:

a first container portion having a sidewall that defines a first interior space;

a second container portion defining a second interior space that is configured to store a writing instrument, the second container portion being positioned on the sidewall of the first container portion;

the first container portion having a closure attached thereto by a hinge, the closure being moveable between a closed position on the container and an open position permitting access to the first interior space;

wherein the closure is provided with an inside surface which faces into the first interior space when the closure is in the closed position and an outside surface which faces away from the first interior space when the closure is in the closed position;

wherein a timepiece is mounted to the inside surface of the closure such that: (i) the timepiece moves with the closure as the closure moves from the open position to the closure position; (ii) the timepiece is disposed outside of the first interior space and is visible when the closure is in the open position; and (iii) the timepiece is disposed within the first interior space and is not visible when the closure is in the closed position; and (b) a writing instrument stored within the second container portion.

4. In combination, the container of claim 3 and a pair of eyeglasses stored within the first container portion.

* * * * *